Aug. 9, 1960  J. C. BAXTER ET AL  2,948,055
METHOD OF MAKING WHEELS
Filed Sept. 27, 1956  2 Sheets-Sheet 1
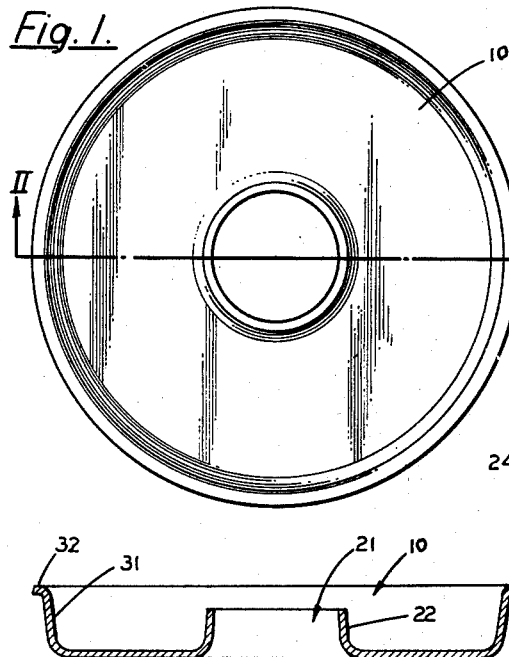
Fig. 1.
Fig. 2.
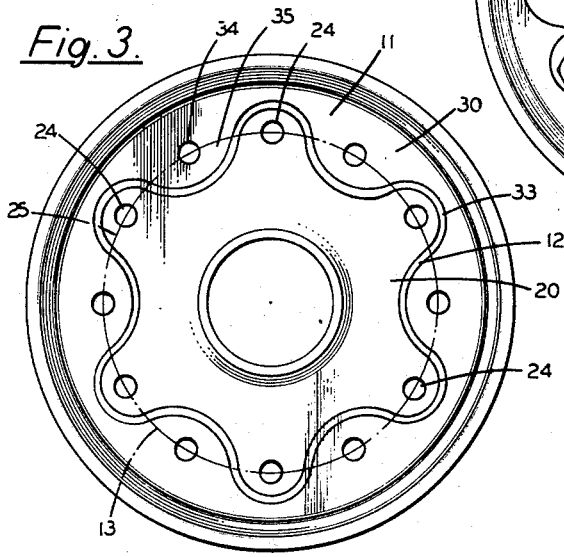
Fig. 3.
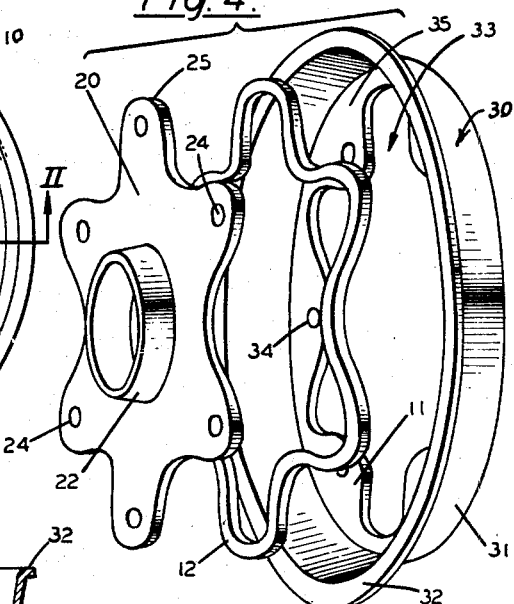
Fig. 4.
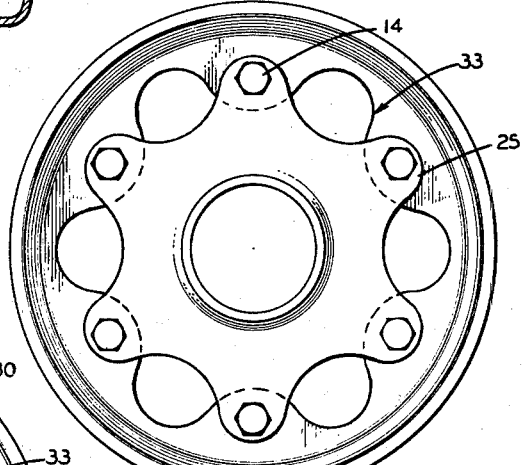
Fig. 5.
Inventors
Egbert Woldring
Maurice DeGraaf
John C. Baxter
By Price and Heneveld
Attorneys Aug. 9, 1960   J. C. BAXTER ET AL   2,948,055
METHOD OF MAKING WHEELS Filed Sept. 27, 1956   2 Sheets-Sheet 2

Inventors
Egbert Woldring
Maurice De Graaf
John C. Baxter
-By-
Price and Heneveld
Attorney

United States Patent Office 2,948,055
Patented Aug. 9, 1960

2,948,055

METHOD OF MAKING WHEELS

John C. Baxter, East Grand Rapids, and Maurice De Graaf and Egbert Woldring, Grand Rapids, Mich., assignors to The Rapids-Standard Company, Inc., Grand Rapids, Mich., a corporation of Michigan Filed Sept. 27, 1956, Ser. No. 612,417

4 Claims. (Cl. 29—159.01)

This invention relates to a method for fabricating a wheel disc assembly and also to the method of fabricating an entire wheel assembly having a detachable wheel disc for removing and interchanging the tires. More particularly this invntion relates to the method for fabricating a caster wheel for trucks and the like.

Many different types of caster wheels have been designed, some of them having means for removing the tire when it is worn. These removable tire types of caster wheel assemblies include a cylindrical hub having a single wheel disc or combination hub and rim discs. To our knowledge in either of these types, the tire is removed by removing the hub disc from the hub.

Difficulties have been experienced in manufacturing or fabricating combination hub and rim disc assemblies. One of these difficulties is the waste of the material and also the time-consuming job of fabricating the two parts. Therefore, for the most part single piece wheel discs have been utilized. Single piece wheel discs are difficult to assemble because each wheel replacement operation requires press-fitting the wheel disc on the hub. This invention is designed to eliminate these difficulties.

The primary object of this invention is to provide a novel method for fabricating a wheel disc assembly including a hub disc and a tire disc or rim.

Another object of this invention is to provide a time and material saving method of fabricating such wheel disc assemblies.

Still another object of this invention is to provide a method of making such a wheel disc assembly entirely out of sheet metal by a few press operations.

A further object of this invention is to provide a novel method of fabricating a complete wheel assembly having detachable wheel discs for removing and interchanging its tire.

Other objects of this invention will become obvious upon reading the following specification in conjunction with the accompanying drawings wherein:

Fig. 1 is the side, elevational view of a circular blank from which the wheel disc assembly is fabricated.

Fig. 2 is a cross-sectional, elevational view taken along the plane II—II of Fig. 1.

Fig. 3 is a side, elevational view of the circular blank of Fig. 1 on which the step of severing the hub disc has been performed.

Fig. 4 is an oblique, side, elevational view of the component parts of the wheel disc assembly including the hub disc and the rim.

Fig. 5 is a side, elevational view of the wheel disc assembly illustrating the position of the rim when attached to the hub disc.

Figures 6, 7, 8:
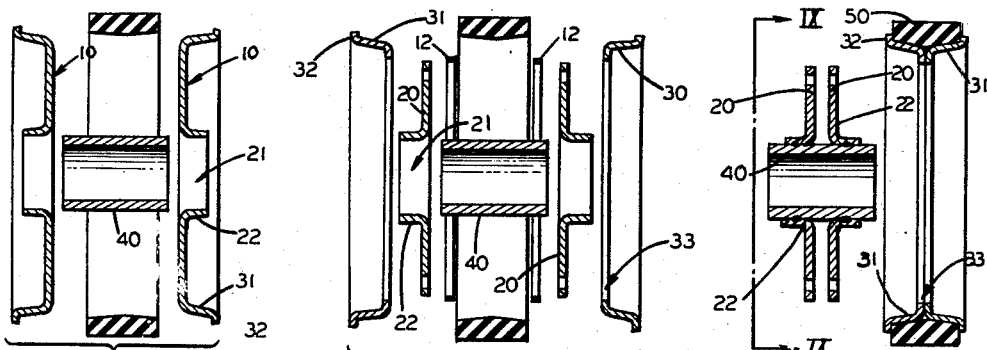
Fig. 6 is a cross-sectional, elevational view of the component elements from which the entire wheel assembly is fabricated.
Fig. 7 is a cross-sectional, elevational view of the same elements upon which the step of severing the hub disc has been performed.
Fig. 8 is a cross-sectional, elevational view of the component parts illustrating the hub disc mounted on the hub member and the rim supporting the tire and ready for installation on the hub assembly, just previous to installation.

Briefly, this invention is concerned with a method of fabricating a wheel disc assembly comprising a hub disc and a rim. In its narrow aspect this invention relates to the method of fabricating the entire wheel assembly.

The method of fabricating the wheel disc assembly includes the steps of providing a circular blank and severing a peripheral section of the blank from a central section thereof along a line of varying radial distance from the center of the blank. The sections are then separated and arranged on a common axis with the portion of greatest radial dimension of the central section overlapping the corresponding portions of least radial dimension of the peripheral section. The two sections are then detachably secured together at their overlapping portion to form the wheel disc assembly.

The method of forming the entire wheel includes the steps of providing a cylindrical hub member and two circular blanks. The two blanks are severed along a line of varying radial distance from its center. This forms the hub disc and the rims which are separated one from the other. The two hub discs are mounted to the cylindrical hub member. This forms the hub assembly which supports the rim and tire assembly. In the preferred form of this invention, the two hub discs are spaced slightly one from the other for receiving the rim and tire assembly. In this preferred form the rims are inserted over and between the hub discs and then rotated between the hub discs so that the portions of greatest radial dimension of the hub disc overlap the portions of least radial dimension of the rims. The hub discs and rims are then detachably secured to each other at these overlapping portions.

A better understanding of our invention will be obtained from the following description made in conjunction with the drawings, of which Figs. 1 through 5 illustrate the basic method of fabricating the wheel disc assembly which constitutes one part of the entire wheel assembly.

Figs. 6 through 11 more specifically illustrate the method of fabricating the entire wheel assembly in which the wheel disc assembly of Figs. 1 through 5 is incorporated.

In Figs. 1–5 reference numeral 10 indicates a circular blank from which the wheel disc assembly is fabricated. Circular blank 10, shown in cross-section in Fig. 2, has a central hub opening 21 formed by the hub sleeve 22 extending axially from the flat portion 11 of the blank. It has a retainer flange 32 at its extreme perimeter for holding the tire as will be described in more detail hereinafter.

The circular blank 10 is constructed of a single piece of sheet metal. Such construction is preferably formed in several steps. The first step is to pierce a central opening for location purposes. In the next step the press blanks and forms the entire disc including the sleeve 22 and rim flanges 31 and 32. The press on the next step pierces the holes 24 and 34 and sizes the blank.

The next step after forming the circular blank 10 is to pierce the flat portion 11 along the wavy lines as shown in Fig. 3, of varying radial distance from the hub opening. This line preferably describes two similar, radially symmetrical figures. By "radially symmetrical" we mean that the similar figures outlined are divisible into equal symmetrical portions by any of three or more planes passing through the axis. In the narrow aspect of the invention, this is important to facilitate easy assembling of the wheel disc assembly. This advantage will be explained in more detail hereinafter.

Piercing the flat portion 11 along the wavy lines as shown in Fig. 3, severs the circular blank into a peripheral section or rim 30, a waste strip 12, and a central section or hub disc 20. The rim 30 thus has an opening 33 corresponding in shape to the perimeter of the hub disc.

The piercing wavy lines pass between the holes 24 and 34 all of which are arranged on the common circumference 13 which is concentric with the hub opening 21. Holes 24 and 34 are thus alternately arranged on each side of the strip 12. As a result, the holes 24 are located in the lobes 25 of the hub disc. The holes 34 are located in the inwardly extending lobes 35 of the rim. The holes are preferably equally spaced around the circumference 13. The holes 24 can be pierced or punched simultaneously with the piercing of the wavy lines. After the blank 10 is pierced, the hub disc 20, waste strip 12, and rim 30 are separated. The separate parts are illustrated in Fig. 4. The two usable parts are the hub disc 20 and rim 30. Waste strip 12 is discarded. The hub disc consists of the sleeve 22 centrally located of the disc. The lobes 25 constituting the portions of greatest radial dimension project radially outwardly. Each lobe has a centrally located hole 24.

The rim includes the rim flange 31 having the flange 32. Rim 30 has an opening 33 corresponding in shape to the hub disc 20. This opening in the flat central portion 11 of the rim forms the lobes 35 which constitute the portions of least radial dimension from the center of the disc. The holes 34 are centrally located in the lobes 35.

The next step after separating the hub disc from the rim is to arrange them on a common axis and rotate one with respect to the other. The degree of rotation is such that the lobes of one overlap the lobes of the other and the holes in the lobes of one are aligned with the holes in the lobes of the other. This permits the insertion of the bolts 14 for detachably securing the two discs together. Fig. 5 illustrates the arrangement of the discs when secured together. The lobes 25 of the hub disc overlap the lobes 35 of the tire disc. The bolts 14 are inserted through the holes 24 and 34 thus detachably securing the discs together.

It should be understood that although we have described this method by the sequential steps of severing, separating and then rotating the discs, in the mass production of this wheel disc assembly a multiple number of hub discs and rims are fabricated before they are rotated for assembly.

Figs. 6–11 illustrate the method of fabricating the entire wheel assembly. In these figures, reference numerals of the various elements and component parts will be the same as used in describing such elements and parts in Figs. 1–5. Therefore, in Fig. 6 reference numeral 10 denotes a circular blank located on each side of a cylindrical hub member 40. Fig. 6 illustrates the step of providing a hub member and two circular wheel blanks. The blanks 10 are identical to that previously described.

The next step illustrated by Fig. 7 is to pierce the blanks 10 forming the hub discs and the rims. This piercing step is identical to that previously described, and the component parts resulting therefrom are also identical to that described and shown in Figs. 3, 4 and 5.

The next step (Fig. 8) consists of fitting the hub disc on the cylindrical hub member 40. This is accomplished by inserting the hub disc on the cylindrical hub 40 and then spot-welding the hub disc to the cylindrical hub.

In the form illustrated the two hub discs 20 are spaced from one another providing a space between them for receiving the rims 30. In this form the rims 30 are clamped about a tire 50 previous to inserting them on the hub assembly formed by the cylindrical hub member 40 and the hub disc 20.

Figure 9:
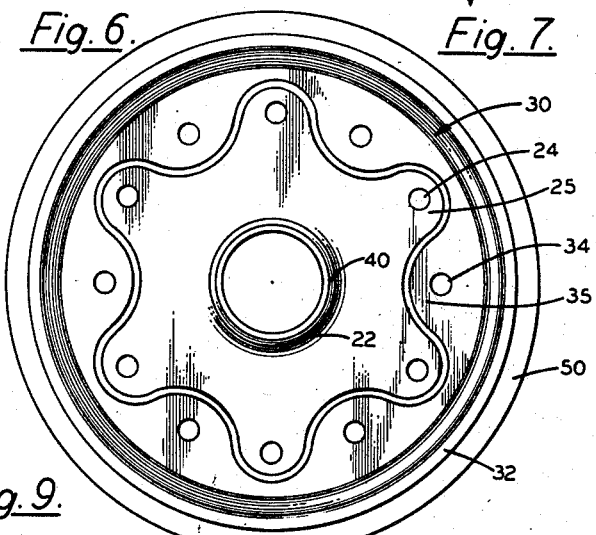
Fig. 9 is a view taken along the plane IX—IX of Fig. 8 and illustrating the relative rotative position of the hub assembly and the rim and tire assembly.
Figure 10:
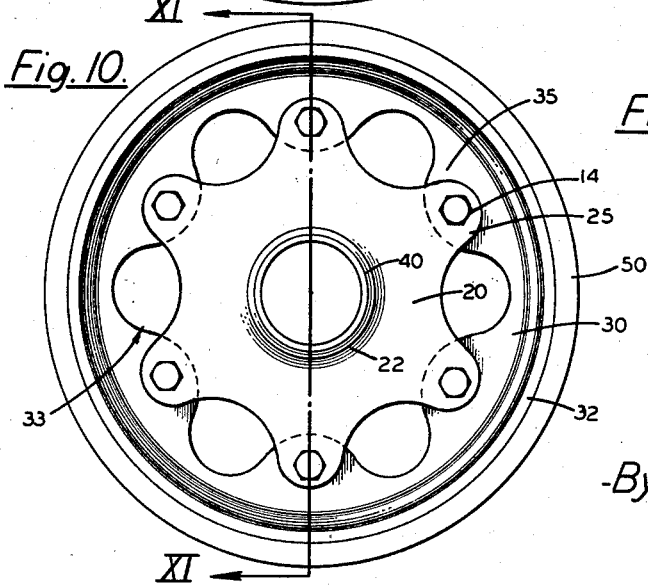
Fig. 10 is a side, elevational view of the wheel showing the rim and tire assembly installed on the hub assembly.
Figure 11:
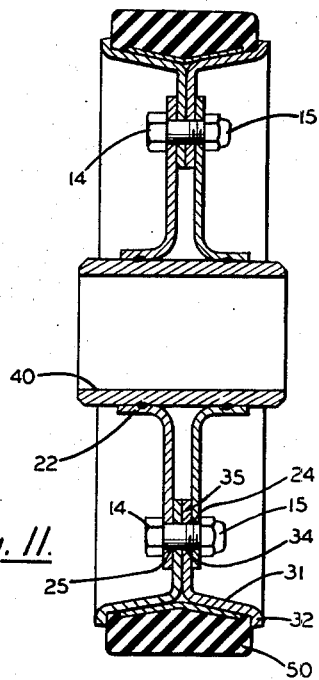
Fig. 11 is a cross-sectional, elevational view taken along the plane XI—XI of Fig. 10.

After sub-assembling the component parts as illustrated by Fig. 8, the rim assembly supporting the tire 50 is positioned on a common axis with the hub assembly so that the hub discs are aligned with the opening 33 as shown by Fig. 9. The rims are then inserted over and between the hub discs so that when rotated the rims will slide between the hub discs. The rims are then rotated causing the lobes 25 of the hub disc to overlap the lobes 35 of the rims. (Fig. 10). In this position the holes 24 of the hub discs are aligned with the holes 34 of the rims. A bolt 14 is then inserted through the aligned holes of all four discs and a nut 15 is installed for securing them together. The resultant assembly is illustrated in Figs. 10 and 11.

Within the broadest aspect of this invention the two hub discs can be arranged on the hub cylinder in such a fashion that they abut one another. In this form the two tire discs are required to be attached to the outside of the hub discs. This modified method of fabricating the wheels is especially preferable when a greater width tire is utilized.

This invention has several obvious advantages. It eliminates waste of material since the hub disc and tire discs are fabricated from one blank. It makes possible the economic fabrication of larger demountable caster wheel assemblies than has heretofore been possible. This in turn results in large savings in replacement costs.

This invention permits welding the hub discs to the hub member, thereby providing a greater strength at this critical point. At the same time, the essential requirement of demountability is maintained. In this method the component parts are fabricated by stamping, drawing, and piercing. Thus, conventional steps of machining or casting are eliminated. As a result the overall cost is measurably decreased.

Having described this invention it should be obvious that although we have shown a preferred form, other forms, modifications, and embodiments are possible within the broadest aspect. Therefore, this invention shall not be limited to the exact form shown except that the claims by their language expressly state otherwise.

We claim:

1. In a method of fabricating a wheel comprising the steps: providing a cylindrical hub member; providing two circular blanks each having a central hub opening adapted to receive said hub member; severing a peripheral section from a central section of each blank along a line of varying radial distance from said hub openings; separating said sections; securing said central sections on said cylindrical hub member; installing a wheel tire between said peripheral sections of said blank; arranging said sections on a common axis with the portions of greatest radial dimension of said central sections overlapping the portions of least radial dimension of said peripheral sections; detachably securing said peripheral sections to said central sections at said overlapping portions.

2. In a method of fabricating a wheel comprising the steps: providing a cylindrical hub member; providing two circular blanks each having a central hub opening adapted to receive said hub member; severing a peripheral section from a central section of each blank along a line of varying radial distance from said hub openings; separating said sections; securing said central sections in spaced relationship on said cylindrical hub member; installing a wheel tire between said peripheral sections of said blank; inserting the peripheral sections over said central sections; arranging said sections on a common axis with the portions of greatest radial dimension of said central sections overlapping the portions of least radial dimension of said peripheral sections; detachably securing said peripheral sections to said central sections at said overlapipng portions.

3. In a method of fabricating a wheel comprising the steps: providing a cylindrical hub member; providing two circular blanks each having a central hub opening adapted to receive said hub member; severing a peripheral section from a central section of each blank along a line of varying radial distance from said hub openings; said line describing a radially symmetrical figure; separating said sections; securing said central sections on said cylindrical hub member; installing a wheel tire between said peripheral sections of said blanks; arranging said sections on a common axis with the portions of greatest radial dimension of said central sections overlapping the portions of least radial dimension of said peripheral sections; detachably securing said peripheral sections to said central sections at said overlapping portions.

4. The method of fabricating a wheel proposed by claim 4 including the step of initially forming said blanks to include an axially disposed outer peripheral flange, providing a radial lip upon the edge of said flange, and positioning said wheel tire upon the flanges and between the lips of adjacently disposed peripheral sections of said blanks during installation.

References Cited in the file of this patent

UNITED STATES PATENTS

| | | |
|---|---|---|
| 1,519,496 | Lofland | Dec. 16, 1924 |
| 1,777,369 | Jacobs | Oct. 7, 1930 |
| 2,323,216 | Goldschmidt | June 29, 1943 |
| 2,476,059 | Merty | July 12, 1949 |